(No Model.)

H. R. EKSTROM.
CANNON WHEEL REMOVER.

No. 422,013. Patented Feb. 25, 1890.

Witnesses,
Geo. H. Strong
J. H. Towne

Inventor,
Harry R. Ekstrom
By Dewey & Co
atty

UNITED STATES PATENT OFFICE.

HARRY R. EKSTROM, OF SANTA ROSA, ASSIGNOR OF ONE-HALF TO ADOLPH F. GUIOL, OF LOS ANGELES, CALIFORNIA.

CANNON-WHEEL REMOVER.

SPECIFICATION forming part of Letters Patent No. 422,013, dated February 25, 1890.

Application filed April 3, 1889. Serial No. 305,892. (No model.)

*To all whom it may concern:*

Be it known that I, HARRY R. EKSTROM, of Santa Rosa, county of Sonoma, State of California, have invented an Improvement in Cannon-Wheel Removers; and I hereby declare the following to be a full, clear, and exact description of the same.

My invention relates to a device for conveniently removing what is known as the "cannon-wheel" from its post in clocks.

It consists in a mechanism which will be more fully explained by reference to the accompanying drawings, in which—

Figure 1:
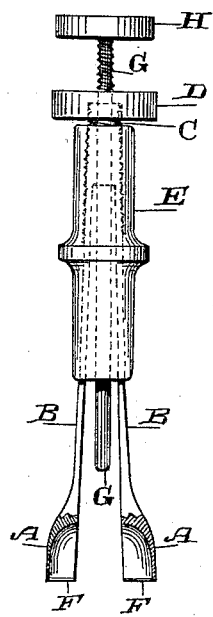
Figure 2:
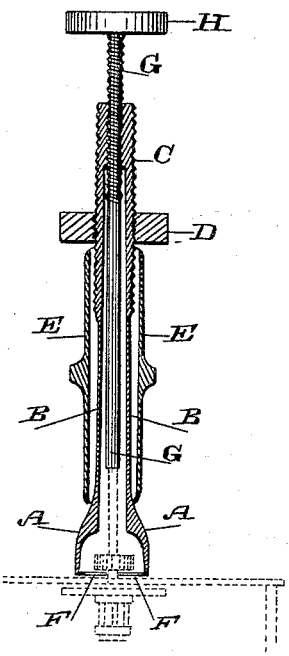
Figure 3:
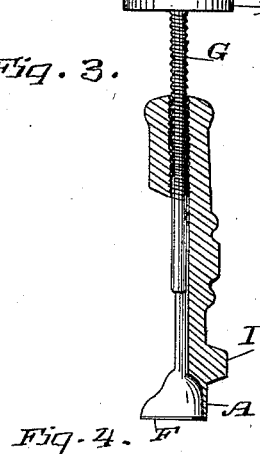
Figure 4:
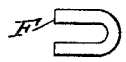

Figure 1 is an exterior view of the device opened. Fig. 2 is a vertical section showing it closed and ready to remove the wheel. Fig. 3 is a modification of the device. Fig. 4 is a face view of the plates F.

The cannon-wheel of a clock is forced upon its post outside of the frame-work and so close to the plate that it is very difficult to insert a tool beneath it or to remove it without damaging the teeth of the wheel, bending the post, or springing the frame.

In my device I have shown the jaws A A, having the elastic extensions B, which terminate at the upper end in a cylindrical tubular shank C, threaded upon and outside, as shown, to receive a nut D, which screws down upon the outside.

E is a tubular sleeve, which slips down over this shank and over the elastic extensions B, so that when forced down to the bottom it closes the jaws A together. These jaws are made hollow and concave at center to receive the cannon-wheel without touching it. Across the lower ends of the jaws is a thin steel plate F, the central portion of each of the opposing jaws being cut out in a semicircular curve, so that the two of them will fit the post of the cannon-wheel when the jaws are closed together, and these plates F are so thin that they may be forced beneath the wheel by the process of closing the jaws together. When the tool is in place with the jaws inclosing the wheel and the plates F beneath it, by turning the nut D down upon the screw-threads of the shank C, the tubular sleeve E will be forced down outside of the spring-extensions B of the jaws A, and will thus close the jaws together, forcing the plates beneath the cannon-wheel, which is then, as before described, inclosed in the cavity within the jaws.

G is a screw-threaded spindle, which extends through the hollow shank C, turning in threads within that shank, and it has a milled head H at the upper end, by which it may be turned. The lower end of this spindle will rest upon the top of the post of the cannon-wheel, and when turned down this post acts as a fulcrum, so that the turning of this screw will draw the jaws A up, and thus by means of the plates F pull the cannon-wheel off of the post by steady pressure, which will do it no damage and will not bend or strain the other parts.

In Fig. 3 I have shown a modification in which only one of the jaws A is employed, the cavity within it forming more than a semicircle, and the plate F has a slot in it from one side, made of sufficient size to surround the cannon-wheel post and allow the plate to pass beneath the cannon-wheel. In this case no sliding sleeve or screw is necessary to close the jaws, as there is only a single one used. This jaw has upon the back a projection or anvil I, which may be struck by a hammer, so as to force the plate F beneath the cannon-wheel. The screw-threaded spindle G is then turned down so as to rest upon the top of the cannon-wheel post, and the operation is then carried out in the same manner as before described.

Having thus described my invention, what I desire to secure by Letters Patent is—

1. The concave jaws with the bottom plates F and the elastic extensions, the tubular shank screw-threaded upon the outside, a sleeve inclosing the jaws and extensions, and a nut D, by which the sleeve is forced down to close the jaws and close the plates together, substantially as and for the purpose described.

2. The concave jaws with the bottom plates F and the elastic extensions, the tubular shank screw-threaded upon the outside and inside, a sleeve inclosing the jaws and extensions, and a nut turning upon the outside of the shank to force the sleeve down and close the jaws, in combination with a central screw-threaded stem or shank turning in the inside of the tubular shank and having its lower end adapted to press upon the end of the wheel-post, substantially as herein described.

In witness whereof I have hereunto set my hand.

HARRY R. EKSTROM.

Witnesses:
   H. C. BROWN,
   J. H. DYSON.